F. R. PACKHAM.
SEEDING MACHINE.
APPLICATION FILED JAN. 26, 1912.
1,039,788.
Patented Oct. 1, 1912.
2 SHEETS—SHEET 1.
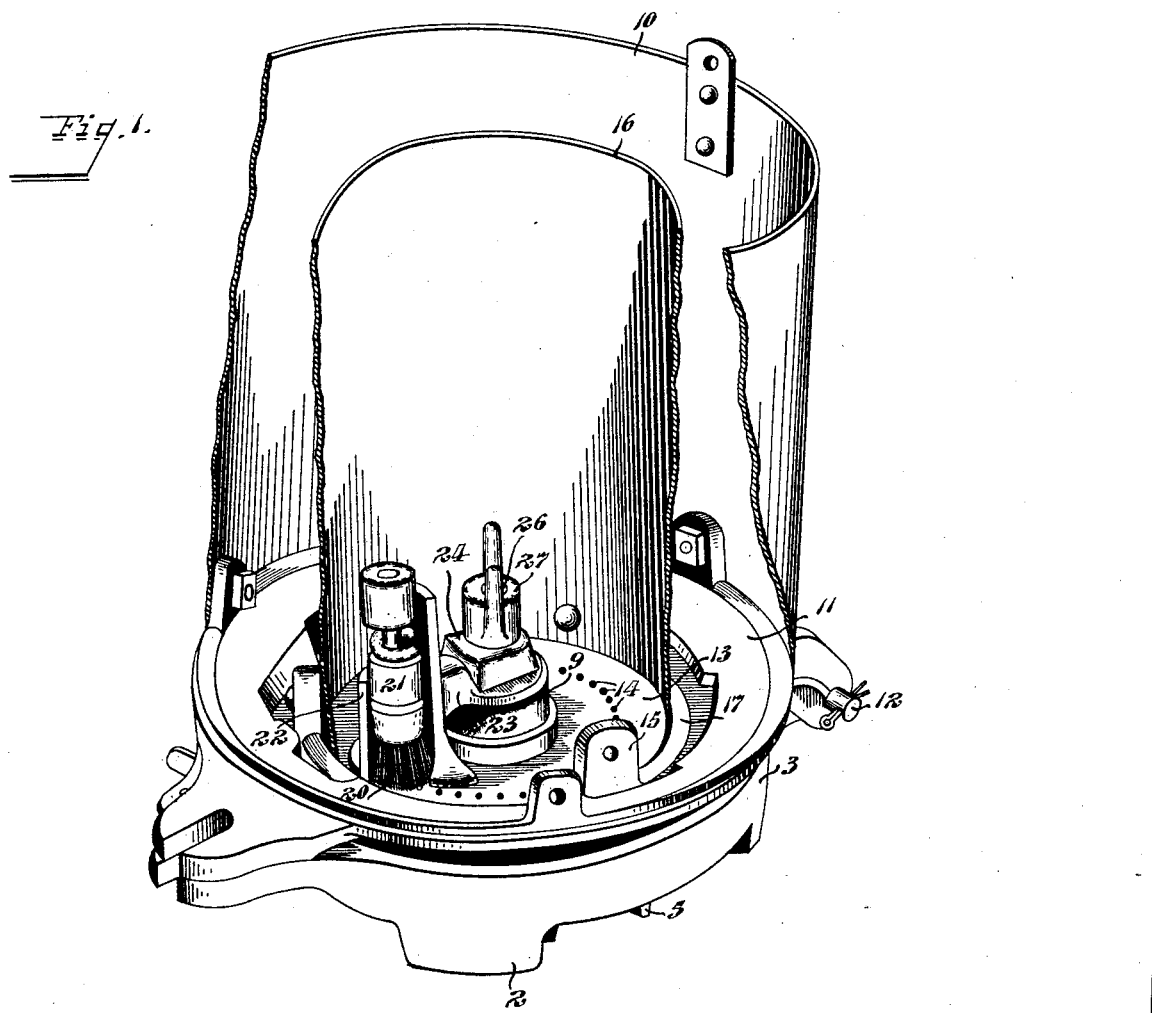

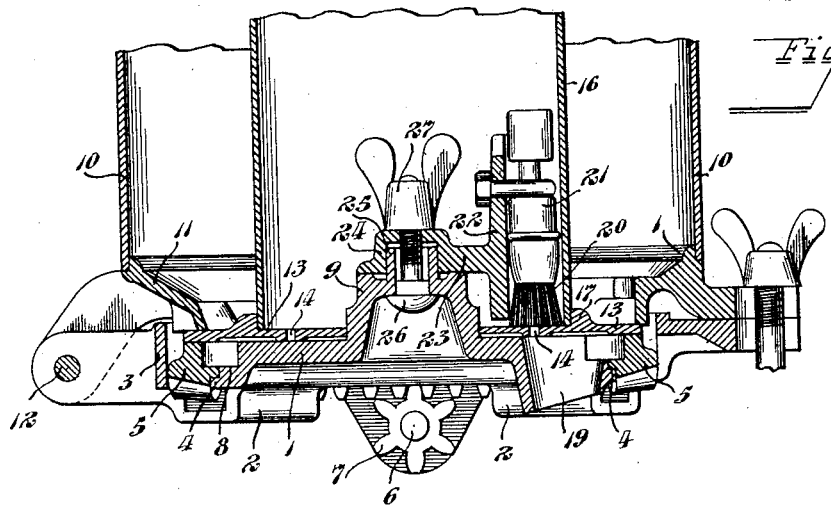

UNITED STATES PATENT OFFICE.

FRANK R. PACKHAM, OF SPRINGFIELD, OHIO, ASSIGNOR TO THE AMERICAN SEEDING MACHINE COMPANY, OF SPRINGFIELD, OHIO, A CORPORATION OF OHIO.

SEEDING-MACHINE.

1,039,788.

Specification of Letters Patent. Patented Oct. 1, 1912.

Application filed January 26, 1912. Serial No. 673,576.

*To all whom it may concern:*

Be it known that I, FRANK R. PACKHAM, a citizen of the United States, residing at Springfield, in the county of Clark and State of Ohio, have invented certain new and useful Improvements in Seeding-Machines, of which the following is a specification.

My invention relates to improvements in seeding machines, and particularly to that type of seeding machine adapted for planting corn and other seed.

The object of the invention is to provide certain auxiliary removable seeding parts for certain of the ordinary seeding devices of a corn planter, to adapt said planter for the sowing of millet and other small seed of that nature in an effective manner and without damage to the seed.

In the accompanying drawings,—Figure 1 is a perspective view, partly broken away, of a corn planter hopper showing my improved devices installed therein. Fig. 2 is a vertical sectional view of the devices shown in Fig. 1, with the upper part of the hoppers broken away. Fig. 3 is a top plan view of the same.

Like parts are represented by similar characters of reference in the several views.

In the said drawings, 1 represents a centrally-arranged bottom support, secured through the medium of depressed webs 2, to the open ring 3, which ring is supported at the top of the usual corn planter post or runner shank. The central support has a ledge 4, which supports the usual gear ring 5, which receives its motion from the operating shaft 6, through the medium of the pinion 7, in the usual way. The support also, in the present case, has a second ledge 8, which forms the bottom of seed cells arranged on the interior of the usual seed plate employed for dropping corn and the like, which seed plate rests on top of the gear ring and is operatively connected therewith through the medium of recesses in the edge of the seed plate, which register with and receive upwardly projecting lugs 5ª on the gear ring, as more fully described in my Letters Patent No. 1,016,766, patented February 6th, 1912, this seed plate not being shown in the present case. As in said patent referred to, the support 1 has a central upwardly extending boss 9, to which is adapted to be attached a dome-shaped cap of the kind and in the manner described in said patent, this cap extending over the support 1 with its edges arranged coincident with the edge of the support proper, for the purpose of guiding the seed to the seed cells of the seed plate previously referred to; this dome likewise not being shown in the present case. The main hopper 10 and its bottom ring 11, is pivotally connected to projecting ears on the ring 3, as at 12, and this is the same hopper described in my prior patent referred to and is for the purpose of receiving the seed when such seed as corn and the like is being planted, and also overlies and retains the seed plate in position. The hopper ring 11 may be of the usual kind employed for guiding the seed to the seed cells, but in the present drawings, this ring is shown formed with serrations in the manner described in my prior patent, although so far as the present invention is concerned, this is immaterial; it being understood that the constructions described and referred to are simply that of one type of seeding devices for a corn planter to which the following described improvements are applicable.

Heretofore, in sowing millet and other small seeds, it has been usual to remove the seed plate for the sowing of corn or other large grains, previously referred to, and substitute therefor a plate with small openings or cells, which occupies the same position as the other plate. Such an arrangement is objectionable, however, for the reason that the space between the hopper ring and the top of the seed plate cannot be closed sufficiently to prevent the small seed from being drawn therein and thereby crushed and destroyed. To overcome this objection, I have devised the following attachment adapted to be substituted for the ordinary seed plate adapted for corn and the like, and also for the cap previously referred to as being used in connection with such a seed plate, which attachment is constructed and operated in the following manner: 13 represents a plate which has a central perforation so as to permit it to fit over the boss 9 of the bottom support. This plate is provided with a series of small openings or cells 14 and also has secured thereto, preferably by bolting to ears 15 thereof, an auxiliary hopper 16 of sheet metal; said plate preferably having an upwardly extending peripheral flange 17, in line with the ears 15, against which the lower outside edge of the hopper fits so as to hold said hopper firmly in position. The series of cells or openings 14, referred to, are of the proper size for the reception of millet and such like seed, and are located on said plate at a point inside of said hopper 16. The plate 13 is extended beyond the hopper 16 a sufficient distance to overlie and be supported by the gear ring 5, when installed in the main hopper, and is adapted to be operatively connected with said gear ring in the same manner as the ordinary seed plate previously referred to; that is, it is provided with a series of peripheral recesses 18 adapted to receive the upwardly projecting lugs 5ᵃ on said gear ring. When the attachment thus described is to be installed, the main hopper and its ring are tilted back, the ordinary seed plate and the dome-shaped cap are removed, and the attachment is set in position and operatively connected up with the gear ring, the seed to be sown being placed in the hopper 16 of the attachment and drops through the usual opening 19 formed in the bottom support. When the main hopper is swung back to its normal position, the hopper ring, resting on the auxiliary seed plate, holds it in position, as in the case of the ordinary seed plate.

Arranged above the opening 19 within the hopper 16, is a cut-off in the nature of a brush 20, the handle 21 of which is clamped in a recessed portion 22 of the projecting arm 23, which arm 23 has a squared recessed portion 24, which fits over the squared reduced end 25 at the upper end of the boss 9 and is clamped thereon by the bolt 26 and thumb-nut 27, so that as the auxiliary hopper and seed plate revolve, the brush remains stationary so as to sweep or cut off all of the excess seed from the seed cells as they pass over the discharge opening 19. The bolt 26 and thumb-nut 27 are the same parts which hold the dome-shaped cap previously referred to, in position.

Having thus described my invention I claim:—

In a seeding machine employing a main hopper, a bottom support, a central upwardly extending boss on said support, a removable seed plate revolubly mounted on said support, an auxiliary hopper connected with said seed plate, and a cut-off in said auxiliary hopper removably connected with said boss.

In testimony whereof, I have hereunto set my hand this 22nd day of January 1912.

FRANK R. PACKHAM.

Witnesses:
MAXMILLA PACKHAM,
CHAS. I. WELCH.